United States Patent Office 3,328,375
Patented June 27, 1967

3,328,375
POLYMERIZATION OF OLEFINS IN THE PRESENCE OF A CATALYST CONSISTING OF TITANIUM TRICHLORIDE, AN ALKYL ALUMINUM DIHALIDE AND AN ALKOXY SILANE
John A. Price, Swarthmore, Pa., assignor to Avisun Corporation, Philadelphia, Pa., a corporation of Delaware
No Drawing. Filed May 19, 1966, Ser. No. 551,227
9 Claims. (Cl. 260—93.7)

This application is a continuation-in-part of my copending application Ser. No. 288,884, filed June 19, 1963, now abandoned, which in turn was a continuation-in-part of my application Ser. No. 124,010 filed July 14, 1961, now abandoned, which in turn was a continuation-in-part of my application Ser. No. 104,019, filed Mar. 19, 1961, now abandoned.

This invention relates to a novel catalyst system for the polymerization of propylene and higher alpha-olefins and to a polymerization process employing the same, and more particularly to a three-component catalyst system consisting of certain types of titanium trichloride, an alkyl aluminum dihalide or sesquichloride, and an alkoxy silane.

It is known that alpha-olefins may be polymerized in the presence of catalysts comprising a transition metal halide such as titanium chloride in combination with an aluminum alkyl or dialkyl aluminum halide such as triethyl aluminum or diethyl aluminum monochloride to form solid crystalline polymers having utility in the fabrication of shaped articles, films, and fibers. However, it has not been found possible heretofore to use an alkyl aluminum dihalide or sesquihalide as an active component of this type of catalyst system even though these compounds are much less expensive than the alkyl aluminum compounds used thus far. Thus, Stuart and Khelghatian show in U.S. Patent 2,967,206 that alkyl aluminum dihalides in conjunction with titanium halides effect polymerization of propylene and higher olefins to oily polymers, but no solid polymers are formed with this catalyst system. The inoperability of this catalyst system is also shown in Belgian Patent 605,604 and in U.S. Patent 3,081,287. While some solid polymer may be obtained using a aluminum sesquihaldide-titanium trichloride catalyst, the yields are very low, and these catalysts are not of commercial interest.

It is an object of this invention to provide a coordination catalyst system, utilizing an alkyl aluminum dihalide or sesquihalide as the organometallic component of the catalyst, which will polymerize propylene and higher olefins to solid crystalline polymers in commercially attractive yields.

It has been found according to the present invention that a catalyst system containing certain types of titanium trichloride, an alkyl aluminum dihalide or sesquihalide and an alkoxy silane is effective in polymerizing propylene, and other 1-alkenes containing as many as 8 or more carbon atoms, to solid crystalline polymers at commercial rates, but only when the ratio of the three components is controlled within certain limits hereinafter set forth. While the ratio of aluminum to titanium is not particularly critical, and can be varied within fairly large limits, the ratio of the aluminum alkyl to the alkoxy silane is quite critical. One form of titanium trichloride useful in my invention is an activated aluminum reduced titanium trichloride which is used with the alkoxy silane and the alkyl aluminum dihalide or sesquihalide. This activated titanium trichloride is defined herein as being predominantly amorphous and may be prepared by ball or rod milling titanium trichloride cocrystallized with aluminum chloride, and having the empirical formula $3TiCl_3 \cdot AlCl_3$, prepared by the reduction of titanium tetrachloride with aluminum, until, as determined by X-ray diffraction, it possesses less than 30% of crystalline structure of the crystalline titanium tricholoride prior to ball or rod milling. In practice, the amount of crystallinity is generally 20% or less, and preferably it is 10% or less. This type of titanium trichloride will be hereinafter referred to as X $TiCl_3$.

A second type of titanium trichloride useful in the practice of the invention is the red precipitate obtained by reacting titanium tetrachloride with an alkyl aluminum dichloride. This is a mixture of titanium trichloride and aluminum chloride of unknown nature having the empirical formula of approximately $TiCl_3 \cdot AlCl_3$. This form of titanium trichloride will be hereinafter referred to as ER $TiCl_3$. A third type of titanium trichloride is ER $TiCl_3$ which has been activated in the same manner as X $TiCl_3$. This type will be hereinafter referred to as ERA $TiCl_3$.

In carrying out polymerizations in accordance with the present invention, the catalyst components are generally dissolved or suspended in an inert hydrocarbon solvent such as hexane, heptane, or octane, or mixtures thereof, in an appropriate reaction vessel, in the absence of oxygen and moisture. The catalyst-containing solvent is then usually brought to a temperature in the range of 25° C. to 150° C., preferably 60° C. to 80° C., and the olefin to be polymerized is introduced into the reaction vessel. When the olefin is a liquid at reaction temperatures, such as 4-methylpentene-1, atmospheric pressure may be used, but when the olefin is normally gaseous, such as propylene or butene-1, moderately elevated pressures are preferably used, as from 20 p.s.i.g. to 500 p.s.i.g., in order to increase the amount of olefin dissolved in the solvent, and thus speed the reaction.

The aluminum component of the catalyst system of this invention may be any alkyl aluminum dihalide, e.g., ethyl aluminum dichloride, propyl aluminum dichloride, butyl aluminum dichloride, or the corresponding bromine or iodine analogues, or sesquihalides such as aluminum ethyl sesquichloride or propyl sesquichloride as well as alkyl aluminum dihalides or sesquihalides, the alkyl radicals of which contain greater numbers of carbon atoms that those illustrated above. When the aluminum compound used is an alkyl aluminum dichloride, it is desirable that it be not contaminated with free aluminum trichloride, since the trichloride reacts with the alkoxy silane to form ethyl chloride, destroying some of the alkoxy radicals to yield a catalyst having less activity. The contamination by free aluminum trichloride may arise from the use of commercially available ethyl aluminum dichloride, which may have a Cl/Al ratio as high as 2.2/1, indicating considerable contamination, or from free aluminum trichloride formed in the preparation of ER $TiCl_3$ as hereafter described. It is therefore desirable to analyze the supernatant liquor prior to polymerization, and to adjust the Cl/Al ratio to not more than about 2.05/1 by adding a sufficient quantity of an aluminum alkyl having less than 2 chlorines per molecule, or, when X $TiCl_3$ is used, to adjust the Cl/Al ratio of the ethyl aluminum dichloride prior to adding it to the $TiCl_3$.

The alkoxy silane component of this invention may be any alkoxy saline, having the formula $R_4Si$, in which at least one R is alkoxy and the remaining R's, if any, are hydrocarbon radicals, such as trimethylethoxysilane, diethyldiethoxysilane, tetramethoxysilane, ethyl orthosilicate, or triphenylethoxysilane. The mol ratio of alkyl aluminum dihalide or sesquihalide to titanium trichloride in the catalyst system should be generally from 0.5:1 to 5:1, and is preferably from about 1:1 to 3:1. The atomic ratio of aluminum of alkoxy saline oxygen, when using an alkoxy saline having only one or two oxygen atoms, should not be below 2:3 since at this ratio polymerization is quite slow, nor should this ratio go above about 4:5. A practical working ratio lies in the range between about 1:1 to about 3:1.

When using a saline having more than two oxygen atoms, the optimum ratio of aluminum to oxygen is somewhat different. It appears that the oxygen in excess of two do not coordinate strongly with the alkyl aluminum dihalide. In such cases the ratio of aluminum to total oxygen should be in the range of 1:3 to 2:1, best results being obtained at an Al/Si ratio of about 3.

The aluminum compound is a necessary part of the catalytic system, since the combination of $TiCl_3$ and the alkoxy saline alone is ineffective to polymerize to crystalline polymers.

In order that those skilled in the art may more fully appreciate the nature of my invention and the manner of carrying it out, the following examples are given.

EXAMPLE I

A polymer bottle was charged with 50 ml. of heptane, 1.72 ml. of 1.05 M heptane solution of ethyl aluminum dichloride, and 0.16 gram of trimethylethoxysilane. The bottle was then cooled and opened, and 0.126 gram of X titanium trichloride was added. The atomic ratio of aluminum to titanium to silane oxygen was 2.0:1.0:1.5. The bottle was then recapped, put back in the 72° C. bath, and the catalyst was aged for 10 minutes. The bottle was then pressured with propylene to 40 p.s.i.g., and this pressure was maintained for 4 hours while agitating the contents of the bottle. The catalyst activity was then killed by the addition of 10 ml. of methanol and 50 ml. of heptane. The polymer was collected on a sintered glass funnel and washed successively with 100 ml. of heptane, 100 ml. of isopropanol, an 100 ml. of methanol. It was then dried in a vacuum oven overnight at 60° C. The solid polypropylene recovered weighed 17.5 grams. The residue from evaporation of the combined heptane solutions weighed 1.0 gram. Repeating the experiment, but without adding ethyl aluminum dichloride, no solid polymer is formed.

EXAMPLE II

Example I was repeated except that 0.11 gram of trimethylethioxysilane was used in place of 0.16 gram. The yield of solid polymer was 11.6 grams. Here the atomic ratio Al:Ti:O was 2.0:1.0:1.0.

EXAMPLE III

Example II was repeated except that 13.2 grams of 4-methylphentene-1 was substituted for propylene. The Al:Ti:O ratio was 2.1:1.0:1.0. There resulted 5.1 grams of solid poly(4-methylpentene-1) and 3.1 grams of pentane-soluble polymer.

EXAMPLE IV 0.36 ml. of 2.52 M ethyl aluminum sesquichloride was pretreated in a pressure bottle in the 72° C. bath for 30 minutes with 0.053 gram of trimethylethoxysilane in 50 ml. of heptane, and 0.07 gram of X titanium trichloride was added. The Al:Ti:O ratio was 2.0:1.0:1.0. The bottle was then pressured with 40 p.s.i.g. of propylene, and polymerization was carried out for 4 hours at 72° C. The resulting dry white powdery polymer weighed 10.6 grams. The residue for evaporation of the combined heptane solution weighed 0.8 gram.

EXAMPLE V

A polymer bottle was charged with 10 ml. of heptane, 1.8 ml. of 0.9 M $EtAlCl_2$ in heptane, 0.0465 gram of ethyl silicate $((EtO)_4Si)$ and agitated at 72° C. for 30 minutes. The bottle was charged with an additional 40 ml. of heptane and one paraffin pellet containing 0.063 gram of X titanium trichloride to yield a catalyst system wherein the mol ratio of $EtAlCl_2$ to $TiCl_3$ to ethyl silicate was 4:1:0.5. After aging for 10 minutes, the slurry was pressured with 40 p.s.i.g. of propylene and the bottle contents were held at 72° C. for 4 hours with agitation. The unreacted propylene was then vented, and the cooled slurry was diluted with 10 ml. of methanol and 100 ml. of heptane. The polymer was collected on a sintered glass funnel, washed successively with 100 ml. portions of heptane, isopropanol, and methanol, and dried in a vacuum oven overnight at 60° C. The yield of solid crystalline prolypropylene was 0.7 gram. The residue from evaporation of the combined heptane solutions weighed 0.3 gram.

EXAMPLE VI

The procedure of Example V was repeated, except that 0.0928 gram of ethyl silicate was used, to yield a mol ratio of $EtAlCl_2$ to $TiCl_3$ to ethyl silicate of 4:1:1. The yield of solid polypropylene was 6.2 grams.

EXAMPLE VII

The procedure of Example V was repeated, except that 0.139 gram of ethyl silicate was used, to yield a mol ratio of $EtAlCl_2$ to $TiCl_3$ to ethyl silicate of 4:1:1.5. The yield of solid heptane-insoluble polypropylene was 13.0 grams.

EXAMPLE VIII

The procedure of Example V was followed, except that 0.186 gram of ethyl silicate was used. The $EtAlCl_2$ to $TiCl_3$ to ethyl silicate mol ratio was 4:1:2, and the yield of solid polypropylene was 7.8 grams.

EXAMPLE IX

The procedure of Example V was followed, except that 0.232 gram of ethyl silicate was used. The $EtAlCl_2$ to $TiCl_3$ to ethyl silicate mol ratio was 4:1:2.5, and the yield of solid polypropylene was 3.0 grams.

EXAMPLE X

The procedure of Example V was repeated, except that 1.40 ml. of 0.97 M $EtAlCl_2$ and 0.104 gram of ethyl silicate were used to yield a mol ratio of $EtAlCl_2$ to $TiCl_3$ to ethyl silicate of 3:1:1.1 The yield of solid polypropylene was 8.1 grams.

EXAMPLE XI

The procedure of Example V was followed, substituting 0.102 gram of methyl silicate for the ethyl silicate. The mol ratio of $EtAlCl_2$ to $TiCl_3$ to methyl silicate was 4:1:1.5 7.3 grams of heptane-insoluble polypropylene were recovered.

EXAMPLE XII

The procedure of Example V was followed, substituting 0.0993 gram of dimethyldiethoxysilane for the ethyl silicate. The mol ratio of $EtAlCl_2$ to $TiCl_3$ to silane was 4:1:1.5. Yield of heptane-insoluble polypropylene was 6.7 grams.

EXAMPLE XIII

The procedure of Example V was followed, substituting 0.122 gram of methyl triethoxysilane for the ethyl silicate. The mol ratio of $EtAlCl_2$ to $TiCl_3$ to silane was 4:1:1.5. The yield of heptane-insoluble polypropylene was 8.9 grams.

EXAMPLE XIV

The procedure of Example V was followed, substituting 0.4 gram of triphenylethoxysilane for the ethyl silicate. The mol ratio of $EtAlCl_2$ to $TiCl_3$ to silane was 4:1:3. 4.6 grams of heptane-insoluble polypropylene were recovered.

EXAMPLE XV

A polymer bottle was charged with 10 ml. of heptane, 1.43 ml. of 0.954 ethyl aluminum sesquichloride in heptane, and 0.0539 gram of ethyl silicate and agitated at 25° C. for 30 minutes. The bottle was charged with an additional 40 ml. of heptane and 0.063 gram of X TiCl$_3$. After aging for 10 minutes at 72° C., the bottle was pressured with propylene to 40 p.s.i.g., and polymerization was carried on for 4 hours. The bottle was then depressured, and the polypropylene was recovered as described in Example V. A yield of 14.3 grams of heptane-insoluble polymer was obtained.

EXAMPLE XVI

A stock slurry of ER TiCl$_3$ was prepared by charging 8.5 ml. of heptane and 8.5 ml. of 9.68 M ethyl aluminum dichloride to a pressure bottle containing a Teflon-coated magnetic stirrer. The bottle was sealed with a crown cap containing a neoprene liner and placed in a 10° C. bath. Into this solution was injected 4.6 ml. of 9.05 M TiCl$_4$. After about 5 minutes a red precipitate of TiCl$_3$·AlCl$_3$ began to form. The bottle was removed from the bath after another 5 minutes and it was agitated at room temperature for 1 hour. It was then placed in a 100° C. bath for 16 hours. After cooling, the slurry was diluted with heptane, so that a 2 ml. aliquot would contain 1 millimol of TiCl$_3$·AlCl$_3$ and 1-millimol of unreacted ethyl aluminum dichloride.

A 2 ml. aliquot of this slurry was then charged to a pressure bottle along with 10 ml. of hexane and 0.357 millimol of ethyl silicate. The slurry was aged with stirring for 30 minutes at 72° C., and then 90 ml. of hexane was added. The bottle was then pressured with 40 p.s.i.g. of propylene and was held, with stirring, at 72° C. for 4 hours. At the end of this period, the product was worked up as previously described. 10.35 grams of hexane-insoluble polypropylene were recovered.

EXAMPLE XVII

Example XVI was repeated, substituting 1 millimol of trimethylethoxysilane for the ethyl silicate used in that example. 10.25 grams of hexane-insoluble polypropylene were recovered.

EXAMPLE XVIII

A portion of the red precipitate formed by the reaction of TiCl$_4$ and ethyl aluminum dichloride was recovered from the slurry by filtration under a nitrogen atmosphere, was washed several times with hexane to remove unreacted ethyl aluminum dichloride, and was dried overnight. The dry powder was then ball-milled for 66 hours with ceramic balls to produce an ERA titanium trichloride. 0.4 millimol of this material was suspended in 100 ml. of hexane, in a pressure bottle together with sufficient ethyl aluminum dichloride and dimethyldiethoxysilane to yield a mol ratio of ethyl aluminum dichloride to ERA titanium trichloride to dimethylethoxysilane of 4:1:1.5. The bottle was then pressured with propylene to 40 p.s.i.g., and the polymerization was carried out at 72° C. for 4 hours. After working up the reaction products, 5.35 grams of hexane-insoluble polypropylene were recovered. In check runs at the same catalyst level using the unground powder (ER TiCl$_3$) and X TiCl$_3$, 3.20 grams and 3.85 grams of hexane-insoluble polypropylene were recovered, respectively.

In the foregoing examples the experiments were conducted in glass equipment, which limited the operating pressure to 40 p.s.i.g., which is well below the pressure which would be employed in a commercial plant. A further series of runs were therefore made in large laboratory scale pressure equipment, at conventional commercial operating conditions of temperature and pressure, to determine whether or not commercial rates could be obtained with these catalysts systems. Commercial rates are expressed in pounds of polymer produced per gallon of solvent per hour, and in order to be considered commercial, a catalyst must produce at least 0.3 pound of polymer per gallon per hour when operating at a titanium trichloride level in the neighborhood of 0.1 gram per 100 ml. of solvent, and preferably in excess of 0.5 pound. At lower rates either the capital investment per pound of production is so large that the operation is not commercially attractive, or unattractively large amounts of catalysts must be used. Results of these further runs are given in the following table. In the table ER(S) TiCl$_3$ refers to the slurry obtained by reacting ethyl aluminum dichloride with titanium tetrachloride in a 2:1 mol ratio, and ERA TiCl$_3$ refers to ER TiCl$_3$ which has been separated from the slurry, dried, and activated by grinding in a Schutz-O'Neill vibratory ball mill for a period of 2 hours. TES refers to trimethylethoxysilane, and ES refers to ethyl orthosilicate. Lbs./hr./gal. refers to the amount of polymer insolube in boiling pentane produced per hour of reaction time per gallon of solvent used. The catalyst ratio is the mol ratio of unreacted ethyl aluminum dichloride to titanium trichloride to the silicon compound. Catalyst level refers to grams of titanium trichloride per 100 ml. of solvent based on the entire weight of the titanium trichloride-aluminum chloride composition used, and not the weight of the titanium trichloride component of the composition.

The procedure used was to charge a one-gallon agitated autoclave with 500 ml. of hexane, and heat it to 72° C. under nitrogen pressure. The catalyst was then added and washed in with an additional 2000 ml. of hexane, and the entire contents of the autoclave were brought to 72° C. while venting nitrogen to 5 p.s.i.g. In all runs except Run 1, in which no hydrogen was used, 22 parts per million by weight, based on the hexane of hydrogen were then pressured into the reactor. The autoclave was then pressured with propylene to the indicated pressure, and polymerization was carried out for a time sufficient to consume 300 ml. of propylene in addition to the amount required to initially pressure the reactor. The reaction was then stopped by the addition of 600 ml. of methanol, and the reaction products were then worked up to recover the pentane-insoluble polypropylene formed in the reaction.

TABLE I

| Run No. | Pressure, p.s.i.g. | TiCl$_3$ Type | Silicon Compound | Catalyst Ratio | Catalyst Level | Lb./hr./gal. |
|---|---|---|---|---|---|---|
| 1 | 150 | X | TES | 4/1/3 | .07 | 0.58 |
| 2 | 150 | X | TES | 4/1/3 | .07 | 0.74 |
| 3 | 150 | X | TES | 2/1/1.5 | .07 | 0.72 |
| 4 | 100 | X | ES | 2/1/0.5 | .07 | 0.31 |
| 5 | 100 | X | ES | 2/1/0.75 | .07 | 0.83 |
| 6 | 100 | X | ES | 2/1/0.9 | .07 | 0.31 |
| 7 | 150 | X | ES | 4/1/1.5 | .07 | 0.79 |
| 8 | 100 | ER(S) | TES | 1/1/0.75 | .12 | 0.33 |
| 9 | 100 | ER(S) | TES | 1/1/0.87 | .12 | 0.46 |
| 10 | 100 | ER(S) | TES | 1/1/1 | .12 | 0.48 |
| 11 | 100 | ER(S) | TES | 1/1/1.1 | .12 | 0.47 |
| 12 | 100 | ER(S) | ES | 1/1/0.47 | .12 | 0.40 |
| 13 | 100 | ER(S) | ES | 1/1/0.47 | .156 | 0.51 |
| 14 | 100 | ER(S) | ES | 3/1/0.95 | .12 | 0.42 |
| 15 | 100 | ERA | ES | 3.8/1/1.2 | .10 | 0.62 |
| 16 | 100 | ERA | ES | 3.8/1/1.2 | .07 | 0.36 |
| 17 | 100 | ERA | ES | 2.5/1/0.79 | .10 | 0.37 |
| 18 | 100 | X | ES | 2.6/1/0.84 | .08 | 0.44 |
| 19 | 100 | X | ES | 1.6/1/0.51 | .08 | 0.45 |

The invention claimed is:
1. In the homopolymerization of alpha-olefins having from 3 to 8 carbon atoms to form solid crystalline polymers, the improvement which comprises contacting the olefin, under polymerization conditions of temperature and pressure, with a catalyst formed by mixing, in an inert hydrocarbon solvent, an alkyl aluminum dihalide, a titanium trichloride selected from the group consisting of X titanium trichloride, ER titanium trichloride, and ERA titanium trichloride as hereinbefore defined, and an alkoxy silane having the formula $R_1R_2R_3R_4Si$ wherein $R_1$ is an alkoxy radical and $R_2$, $R_3$, and $R_4$ are selected from the group consisting of alkoxy radicals and hydrocarbon radicals, and wherein the mol ratio of alkyl aluminum compound to titanium trichloride is from about 0.5:1 to 5:1, and the mol ratio of alkyl aluminum compound to total alkoxy silane oxygen is from 1:3 to 4:1.

2. The process according to claim 1 in which the alpha-olefin is propylene.

3. The process according to claim 1 in which the alkyl aluminum compound is ethyl aluminum dichloride.

4. The process according to claim 3 in which the silane is ethyl orthosilicate.

5. The process according to claim 3 in which the silane is trimethylethoxysilane.

6. The process according to claim 4 in which the titanium trichloride is X titanium trichloride.

7. The process according to claim 4 in which the titanium trichloride is ER titanium chloride.

8. The process according to claim 4 in which the titanium trichloride is ERA titanium chloride.

9. The process according to claim 6 in which the mol ratio of ethyl aluminum dichloride to titanium trichloride is from 1:1 to 4:1, and the mol ratio of ethyl aluminum dichloride to ethyl orthosilicate is from 2:1 to 6:1.

References Cited

UNITED STATES PATENTS 3,268,624   8/1966   Jezl et al. _____ 260—878

JOSEPH L. SCHOFER, *Primary Examiner.*

M. KURTZMAN, *Assistant Examiner.*